(12) United States Patent
Hsu

(10) Patent No.: US 10,088,130 B2
(45) Date of Patent: Oct. 2, 2018

(54) OPTICAL DEVICE

(71) Applicant: Delta Electronics, Inc., Taoyuan (TW)

(72) Inventor: Ming-Yo Hsu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 370 days.

(21) Appl. No.: 14/950,920

(22) Filed: Nov. 24, 2015

(65) Prior Publication Data

US 2016/0273737 A1 Sep. 22, 2016

Related U.S. Application Data

(60) Provisional application No. 62/136,126, filed on Mar. 20, 2015.

(51) Int. Cl.
*G03B 21/20* (2006.01)
*H04N 9/31* (2006.01)
*F21V 14/08* (2006.01)
*F21V 13/02* (2006.01)
*F21V 13/14* (2006.01)
*F21V 9/30* (2018.01)
*G03B 33/00* (2006.01)
*G03B 21/16* (2006.01)

(52) U.S. Cl.
CPC ............... *F21V 14/08* (2013.01); *F21V 9/30* (2018.02); *F21V 13/02* (2013.01); *F21V 13/14* (2013.01); *G03B 21/204* (2013.01); *G03B 33/00* (2013.01); *G03B 21/16* (2013.01); *H04N 9/3158* (2013.01)

(58) Field of Classification Search
CPC .............. G03B 21/204; G03B 21/2013; G03B 21/2033; H04N 9/3158; H04N 9/3161; H04N 9/3164
See application file for complete search history.

(56) References Cited

U.S. PATENT DOCUMENTS

| 2012/0268503 | A1* | 10/2012 | Sugiyama | H04N 9/3161 345/690 |
| 2012/0300178 | A1 | 11/2012 | Sugiyama et al. | |
| 2013/0021582 | A1* | 1/2013 | Fujita | G03B 21/204 353/31 |
| 2013/0033682 | A1 | 2/2013 | Hsu et al. | |
| 2014/0347634 | A1 | 11/2014 | Bommerbach et al. | |

FOREIGN PATENT DOCUMENTS

| CN | 202771146 U | 3/2013 |
| JP | 2012-247491 | 12/2012 |
| TW | 201443544 | 11/2014 |
| TW | I467242 | 1/2015 |
| WO | WO 2014/174559 A1 | 10/2014 |

* cited by examiner

*Primary Examiner* — Ryan Howard
(74) *Attorney, Agent, or Firm* — Muncy, Geissler, Olds & Lowe, P.C.

(57) ABSTRACT

An optical device is provided. The optical device includes a fluorescent wheel, a first light source engine and a second light source engine. The fluorescent wheel includes a fluorescent powder area. The first light source engine provides a first light beam, wherein the first light beam forms a first light spot on the fluorescent powder area of the fluorescent wheel. The second light source engine provides a second light beam, wherein the second light beam forms a second light spot on the fluorescent powder area of the fluorescent wheel, and the first light spot is separated from the second light spot.

10 Claims, 7 Drawing Sheets

OPTICAL DEVICE

CROSS REFERENCE TO RELATED APPLICATIONS

This application claims the benefit of U.S. Provisional Application No. 62/136,126, filed Mar. 20, 2015, the entirety of which is incorporated by reference herein.

BACKGROUND OF THE DISCLOSURE

Technical Field

The present disclosure relates to an optical device, and in particular to a projector.

Description of the Related Art

Conventionally, a projector utilizes a laser source (commonly a blue light lase source) and a fluorescent element to provide projection light. However, after long-term use, thermal decay decreases the induction efficiency of the fluorescent element. The inducing efficiency decrease often occurs on single-chip digital light processing optical devices and three-chip digital light processing optical devices. Therefore, improving the heat dissipation and luminous efficiency of the fluorescent element is an important issue of the solid-state lighting technology.

BRIEF SUMMARY OF THE DISCLOSURE

An optical device is provided. The optical device includes a fluorescent wheel, a first light source engine and a second light source engine. The fluorescent wheel includes a fluorescent powder area. The first light source engine provides a first light beam, wherein the first light beam forms a first light spot on the fluorescent powder area of the fluorescent wheel. The second light source engine provides a second light beam, wherein the second light beam forms a second light spot on the fluorescent powder area of the fluorescent wheel, and the first light spot is separated from the second light spot.

In one embodiment, a first straight line passes through the center of the fluorescent wheel and the first light spot, a second straight line passes through the center of the fluorescent wheel and the second light spot, and an included angle between the first straight line and the second straight line is between 45 and 180 degrees.

In one embodiment, a first distance is formed between the first light spot and the center of the fluorescent wheel, a second distance is formed between the second light spot and the center of the fluorescent wheel, and the first distance differs from the second distance.

In one embodiment, the fluorescent wheel comprises a first transparent portion and a second transparent portion. When the first transparent portion corresponds to the first light source engine, the second transparent portion corresponds to the second light source engine, and the first light beam passes through the first transparent portion, and the second light beam passes through the second transparent portion.

In one embodiment, the first light source engine is independent from the second light source engine.

In one embodiment, the first light source engine comprises a first light source, a first lens unit and a first dichroic mirror. In a first mode, the first light beam travels from the first light source, passing through a first lens group of the first lens unit, the first dichroic mirror, a second lens group of the first lens unit, the first transparent portion or the second transparent portion of the fluorescent wheel, a third lens group of the first lens unit, and a fourth lens group of the first lens unit to be output. In a second mode, the first light beam travels from the first light source, passing through the first lens group of the first lens unit, the first dichroic mirror, the second lens group of the first lens unit to the fluorescent wheel, and fluorescent powder in the fluorescent powder area of the fluorescent wheel is induced by the first light beam and generates a first induced light, and the first induced light travels from the fluorescent wheel, passing through second lens group of the first lens unit, reflected by the first dichroic mirror and passing through the fourth lens group of the first lens unit to be output.

In one embodiment, the second light source engine comprises a second light source, a second lens unit and a second dichroic mirror. In the first mode, the second light beam travels from the second light source, passing through a fifth lens group of the second lens unit, the second dichroic mirror, a sixth lens group of the second lens unit, the first transparent portion or the second transparent portion of the fluorescent wheel, a seventh lens group of the second lens unit, and an eighth lens group of the second lens unit to be output. In the second mode, the second light beam travels from the second light source, passing through the fifth lens group of the second lens unit, the second dichroic mirror, the sixth lens group of the second lens unit to the fluorescent wheel, and the fluorescent powder in the fluorescent powder area of the fluorescent wheel is induced by the second light beam and generates a second induced light, and the second induced light travels from the fluorescent wheel, passing through sixth lens group of the second lens unit, reflected by the second dichroic mirror and passing through the eighth lens group of the second lens unit to be output.

In one embodiment, the first light source engine comprises a first sub light source, a second sub light source, a first lens unit and a first dichroic mirror. The first light beam travels from the first sub light source, passing a portion of the first lens unit, the first dichroic mirror to the fluorescent wheel, fluorescent powder in the fluorescent powder area of the fluorescent wheel is induced by the first light beam to generate a first induced light, and the first induced light travels from the fluorescent wheel, passing through a portion of the first lens unit, and reflected by the first dichroic mirror to be output, and a third light beam travels from the second light source, passing a portion of the first lens unit and the first dichroic mirror to be output.

In one embodiment, the second light source engine comprises a third sub light source, a fourth sub light source, a second lens unit and a second dichroic mirror. The second light beam travels from the third sub light source, passing a portion of the second lens unit, the second dichroic mirror to the fluorescent wheel, the fluorescent powder in the fluorescent powder area of the fluorescent wheel is induced by the second light beam to generate a second induced light, and the second induced light travels from the fluorescent wheel, passing through a portion of the second lens unit, and reflected by the second dichroic mirror to be output, and a fourth light beam travels from the fourth light source, passing a portion of the second lens unit and the second dichroic mirror to be output.

In one embodiment, the first light source engine comprises a first light source, a first lens unit and a first reflector. The first light beam travels from the first light source, passing through a portion of the first lens unit and the fluorescent wheel, a portion of the first light beam directly passing through the fluorescent wheel, fluorescent powder in the fluorescent powder area of the fluorescent wheel is induced by the other portion of the first light beam to generate a first induced light, and the first induced light passes through the fluorescent wheel, and both the first induced light and the portion of the first light beam directly passing through the fluorescent wheel are reflected by the first reflector to be output.

In one embodiment, the second light source engine comprises a second light source, a second lens unit and a second reflector. The second light beam travels from the second light source, passing through a portion of the second lens unit and the fluorescent wheel, a portion of the second light beam directly passing through the fluorescent wheel, the fluorescent powder in the fluorescent powder area of the fluorescent wheel is induced by the other portion of the second light beam to generate a second induced light, and the second induced light passes through the fluorescent wheel, and both the second induced light and the portion of the second light beam directly passing through the fluorescent wheel are reflected by the second reflector to be output.

In one embodiment, the fluorescent powder area of the fluorescent wheel comprises a first section, a second section and a third section, a color of the first section differs from a color of the second section, a color of the third section differs from the color of the first section, and the first section, the second section and the third section are arranged along the circumference of the fluorescent wheel.

In the embodiment mentioned above, the first light spot is separated from the second light spot to decrease the power of single one light spot, and the heat accumulation is therefore decreased. In the conventional concept, considering the high rotation speed of the fluorescent wheel, the heat accumulation cannot be improved even if the first light spot is separated from the second light spot. However, after experimentation, the applicant found that the heat accumulation can be markedly improved by separating the first light spot from the second light spot. Particularly when the phase angle between the first light spot and the second light spot is between 45 and 180 degrees (180 degrees being preferred), the heat accumulation is decreased, thermal decay is prevented, and the inducing efficiency of the fluorescent element is maintained. In one embodiment, the power of the first light spot is 95 W, and the power of the second light spot is 95 W. Compared to the conventional design utilizing a single light spot with 190 W, the temperature of the fluorescent wheel of the embodiment of the disclosure is decreased to 160° C. from 190° C., and the illumination of the embodiment of the disclosure is increased from 4% to 5%.

A detailed description is given in the following embodiments with reference to the accompanying drawings.

BRIEF DESCRIPTION OF THE DRAWINGS

The present disclosure can be more fully understood by reading the subsequent detailed description and examples with references made to the accompanying drawings, wherein.

DETAILED DESCRIPTION OF THE PREFERRED EMBODIMENT

The following description is of the best-contemplated mode of carrying out the disclosure. This description is made for the purpose of illustrating the general principles of the disclosure and should not be taken in a limiting sense. The scope of the disclosure is best determined by reference to the appended claims.

Figure 1:
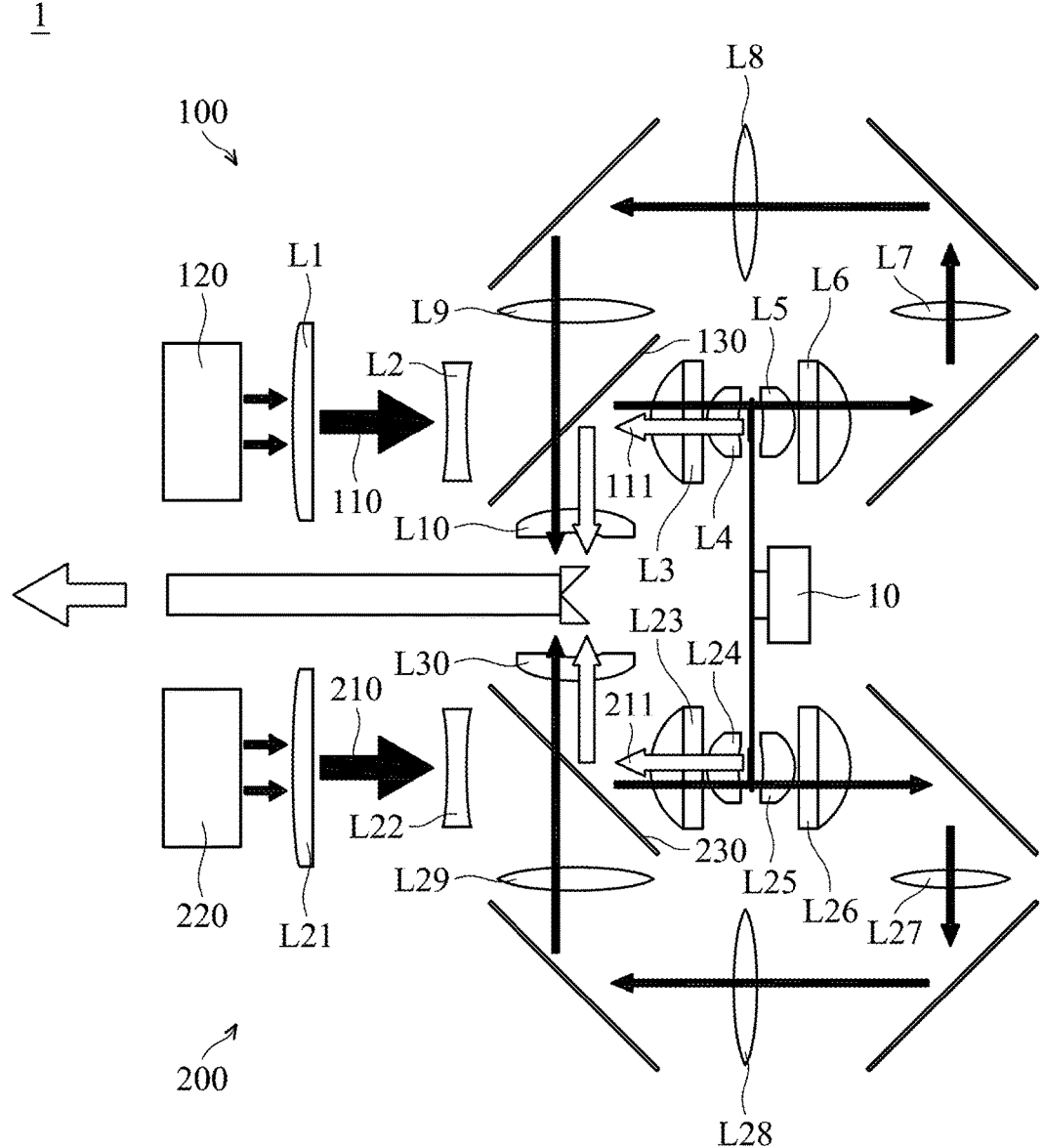
FIG. 1 shows a single-chip digital light processing optical device of an embodiment of the disclosure.
Figure 2:
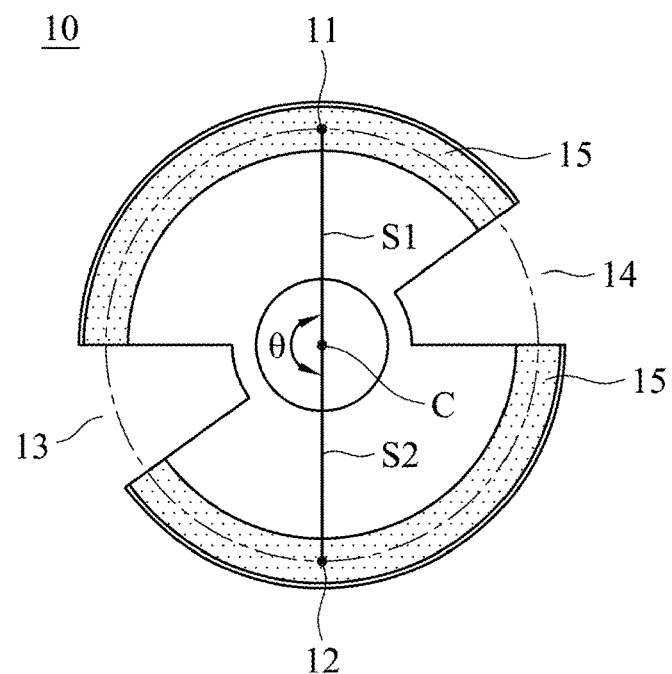
FIG. 2 shows a fluorescent wheel of the embodiment of FIG. 1.

FIG. 1 shows an optical device 1 of a first embodiment of the disclosure, including a fluorescent wheel 10, a first light source engine 100 and a second light source engine 200. FIG. 2 shows a fluorescent wheel 10 of an embodiment of the disclosure. The fluorescent wheel 10 includes a fluorescent powder area 15 coated with fluorescent powder. With reference to FIGS. 1 and 2, the first light source engine 100 provides a first light beam 110. The first light beam 110 forms a first light spot 11 on the fluorescent powder area 15 of the fluorescent wheel 10. The second light source engine 200 provides a second light beam 210. The second light beam 210 forms a second light spot 12 on the fluorescent powder area 15 of the fluorescent wheel 10, and the first light spot 11 is separated from the second light spot 12.

In one embodiment, a first straight line S1 passes through the center C of the fluorescent wheel 10 and the first light spot 11. A second straight line S2 passes through the center C of the fluorescent wheel 10 and the second light spot 12. An included angle θ between the first straight line S1 and the second straight line S2 is between 45 and 180 degrees. In this embodiment, the included angle θ between the first straight line S1 and the second straight line S2 is 180 degrees. In another embodiment, the included angle θ between the first straight line S1 and the second straight line S2 can be 45 degrees.

In the embodiment mentioned above, the first light spot is separated from the second light spot to decrease the power of single one light spot, and the heat accumulation is therefore decreased. In the conventional concept, considering the high rotation speed of the fluorescent wheel, the heat accumulation cannot be decreased even if the first light spot is separated from the second light spot. However, after experimentation, the applicant found that the heat accumulation can be markedly decreased by separating the first light spot from the second light spot. Particularly when the phase angle between the first light spot and the second light spot is between 45 and 180 degrees (180 degrees being preferred), the heat accumulation is decreased, thermal decay is prevented, and the inducing efficiency of the fluorescent element is maintained. In one embodiment, the power of the first light spot 11 is 95 W, and the power of the second light spot 12 is 95 W. Compared to the conventional design utilizing a single light spot with 190 W, the temperature of the fluorescent wheel of the embodiment of the disclosure is only 160° C. the conventional design is 190° C., and the illumination of the embodiment of the disclosure can be increased 4% to 5%.

Figure 3:
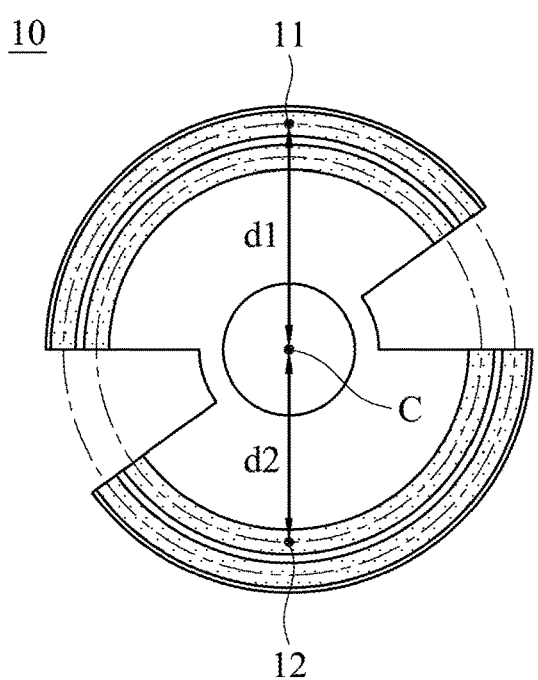
FIG. 3 shows a modified example of the embodiment of FIG. 1.

In the embodiment mentioned above, the distance between the first light spot and the center of the fluorescent wheel equals the distance between the second light spot and the center of the fluorescent wheel. However, the disclosure is not meant to restrict the disclosure. With reference to FIG. 3, in one embodiment, a first distance d1 is formed between the first light spot 11 and the center C of the fluorescent wheel 10. A second distance d2 is formed between the second light spot 12 and the center C of the fluorescent wheel 10. The first distance d1 differs from the second distance d2. In this embodiment, the heat accumulation is further decreased by the difference between the first distance d1 and the second distance d2. In this embodiment, the power of the first light source engine can be different from the power of the second light source engine to make the temperature of the fluorescent wheel 10 uniform.

With reference to FIG. 2, in one embodiment, the fluorescent wheel 10 comprises a first transparent portion 13 and a second transparent portion 14. When the first transparent portion 13 corresponds to the first light source engine 100, the second transparent portion 14 corresponds to the second light source engine 200. The first light beam 110 passes through the first transparent portion 13, and the second light beam 210 passes through the second transparent portion 14. Certainly, the fluorescent wheel 10 rotates continuously. Therefore, when the second transparent portion 14 corresponds to the first light source engine 100, the first transparent portion 13 corresponds to the second light source engine 200. The first light beam 110 passes through the second transparent portion 14, and the second light beam 210 passes through the first transparent portion 13. Additionally, the transparent portions can be empty notches or made of transparent material, such as transparent glass.

In one embodiment, the first light source engine is independent from the second light source engine. FIG. 1 shows an embodiment of single-chip digital light processing optical device. The first light source engine comprises a first light source 120, a first lens unit (L1~L10) and a first dichroic mirror 130. In a first mode, the first light beam 110 travels from the first light source 120, and passes through a first lens group (L1, L2) of the first lens unit, the first dichroic mirror 130, a second lens group (L3, L4) of the first lens unit, the fluorescent wheel 10, a third lens group (L5, L6, L7, L8, L9) of the first lens unit, and a fourth lens group (L10) of the first lens unit to be output (in one embodiment, a blue light is output, wherein the first light beam 110 passes through the first transparent portion 13 and the second transparent portion 14 of the rotating fluorescent wheel 10). In a second mode, the first light beam 110 travels from the first light source 120, passing through the first lens group (L1, L2) of the first lens unit, the first dichroic mirror 130, the second lens group (L3, L4) of the first lens unit to the fluorescent wheel 10, then the light spot 11 is located in the fluorescent powder area 15. The fluorescent powder in the fluorescent powder area 15 of the fluorescent wheel 10 is induced by the first light beam 110 and generates a first induced light 111 (in one embodiment, the first induced light is red light and green light). The first induced light 111 travels from the fluorescent wheel 10, passing through the second lens group (L4, L3) of the first lens unit, reflected by the first dichroic mirror 130 and passing through the fourth lens group (L10) of the first lens unit to be output. The second light source engine comprises a second light source 220, a second lens unit (L21~L30) and a second dichroic mirror 230. In the first mode, the second light beam 210 travels from the second light source 220, passing through a fifth lens group (L21, L22) of the second lens unit, the second dichroic mirror 230, a sixth lens group (L23, L24) of the second lens unit, the fluorescent wheel 10, a seventh lens group (L25, L26, L27, L28, L29) of the second lens unit, and an eighth lens group (L30) of the second lens unit to be output (in one embodiment, a blue light is output, wherein the first light beam 110 passes through the first transparent portion 13 and the second transparent portion 14 of the rotating fluorescent wheel 10). In the second mode, the second light beam 210 travels from the second light source 220, passing through the fifth lens group (L21, L22) of the second lens unit, the second dichroic mirror 230, the sixth lens group (L23, L24) of the second lens unit to the fluorescent wheel 10, then the light spot 12 is located in the fluorescent powder area 15. The fluorescent powder in the fluorescent powder area 15 of the fluorescent wheel 10 is induced by the second light beam 210 and generates a second induced light 211 (in one embodiment, the second induced light is red light and green light). The second induced light 211 travels from the fluorescent wheel 10, passing through sixth lens group (L24, L23) of the second lens unit, reflected by the second dichroic mirror 230 and passing through the eighth lens group (L30) of the second lens unit to be output.

Figure 4A:
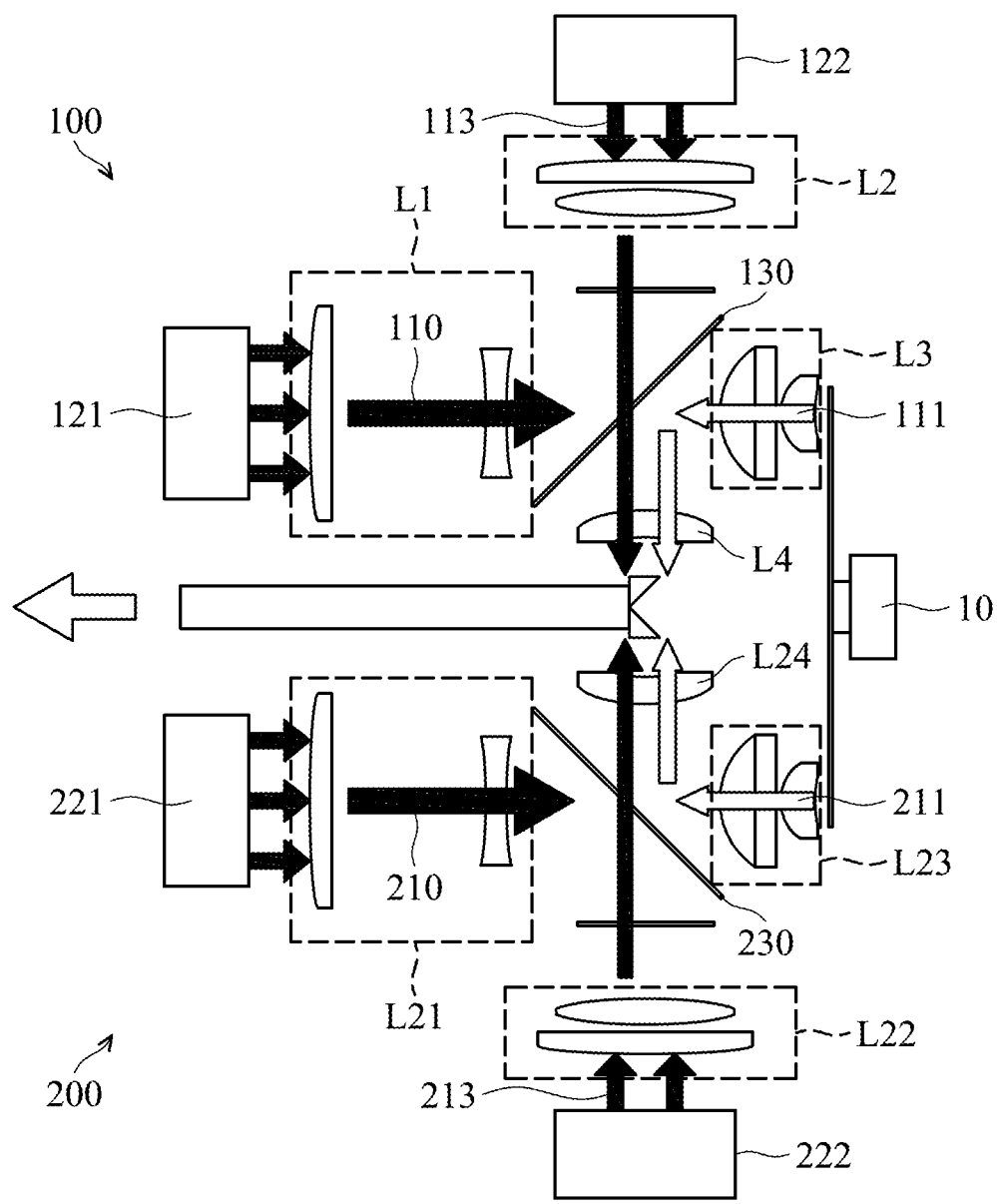
FIG. 4A shows a three-chip digital light processing optical device of an embodiment of the disclosure.

The embodiment above shows a single-chip digital light processing optical device. However, the embodiment is not meant to restrict the disclosure. FIG. 4A shows a three-chip digital light processing optical device 2. In the embodiment of FIG. 4A, the elements with similar functions follow the labels of the embodiment of FIG. 1. The first light source engine 100 comprises a first sub light source 121, a second sub light source 122, a first lens unit (L1~L4) and a first dichroic mirror 130. The first light beam 110 (in one embodiment, the first light beam is blue light) travels from the first sub light source 121, passing the first lens group (L1) of the first lens unit, the first dichroic mirror 130, and the third lens group (L3) of the first lens unit to the fluorescent wheel 10, the fluorescent powder in the fluorescent powder area 15 of the fluorescent wheel 10 is induced by the first light beam 110 to generate a first induced light 111 (in one embodiment, the first induced light is red light and green light). The first induced light 111 travels from the fluorescent wheel 10, passing through the third lens group (L3) of the first lens unit, and reflected by the first dichroic mirror 130 to be output through the fourth lens group (L4) of the first lens unit. A third light beam 113 travels from the second light source 122, passing the second lens group (L2) of the first lens unit and the first dichroic mirror 130 to be output through the fourth lens group (L4) of the first lens unit (in one embodiment, the third light beam is blue light). The second light source engine 200 comprises a third sub light source 221, a fourth sub light source 222, a second lens unit (L21~L24) and a second dichroic mirror 230. The second light beam 210 (in one embodiment, the second light beam is blue light) travels from the third sub light source 221, passing the fifth lens group (L21) of the second lens unit, the second dichroic mirror 230 and the seventh lens group (L23) to the fluorescent wheel 10. The fluorescent powder in the fluorescent powder area 15 of the fluorescent wheel 10 is induced by the second light beam 210 to generate a second induced light 211 (in one embodiment, the second induced light is red light and blue light), and the second induced light 211 travels from the fluorescent wheel 10, passing the seventh lens group (L23) of the second lens unit, and reflected by the second dichroic mirror 230 to be output through the eighth lens group (L24) of the second lens unit. A fourth light beam 213 travels from the fourth light source 222, passing the sixth lens group (L22) of the second lens unit and the second dichroic mirror 230 to be output through the eighth lens group (L24) of the second lens unit (in one embodiment, the fourth light beam is blue light).

Figure 4B:
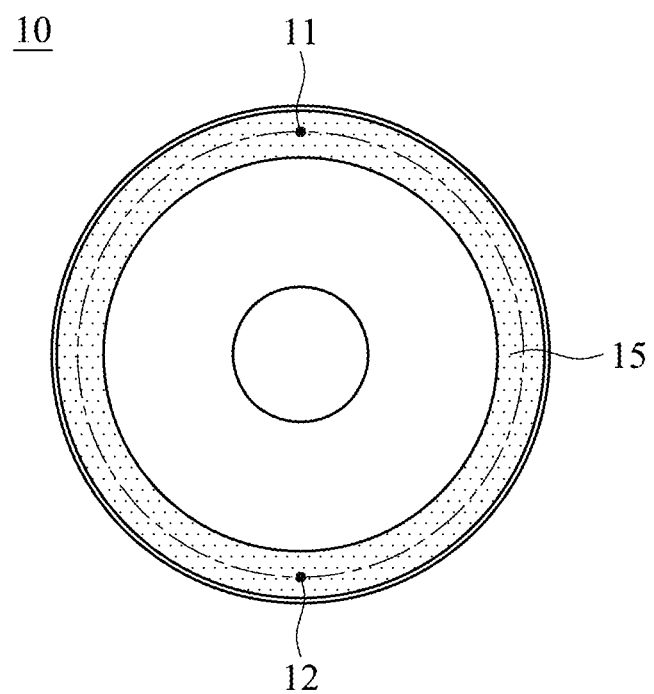
FIG. 4B shows a fluorescent wheel of the embodiment of FIG. 4A.

With reference to FIG. 4B, in the embodiment of FIG. 4A, the fluorescent wheel 10 has no transparent portion.

Figure 5A:
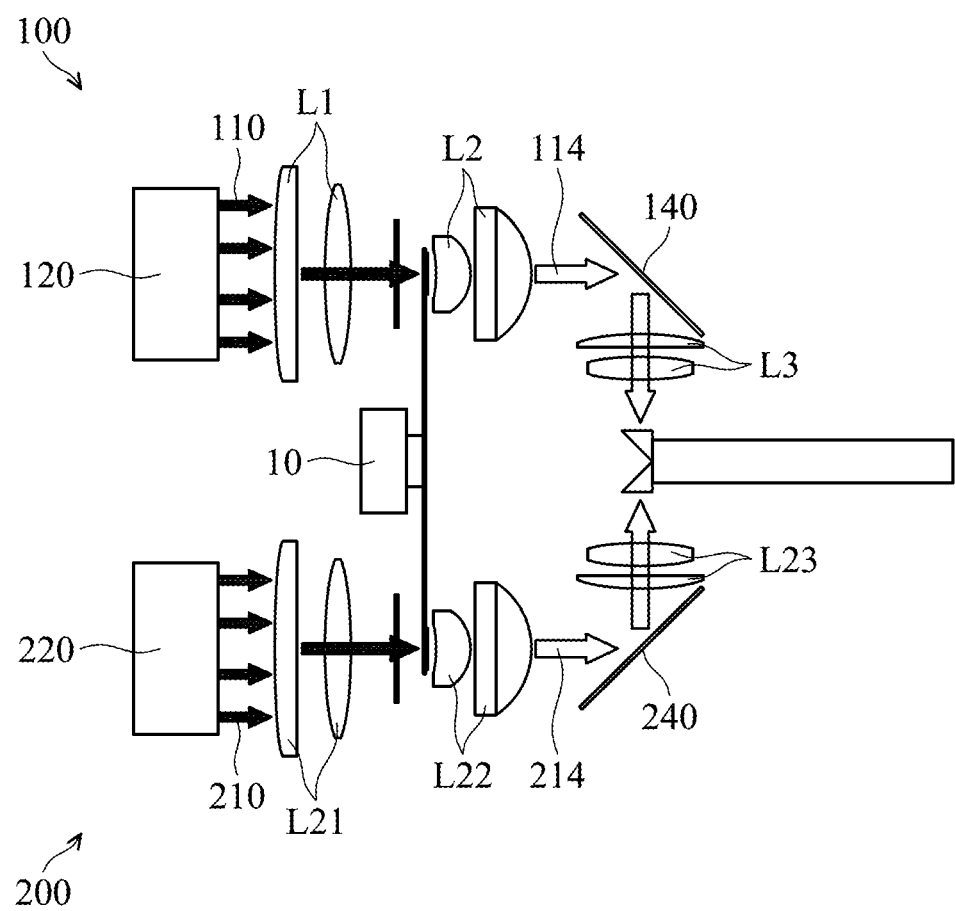
FIG. 5A shows a digital light processing optical device of an embodiment of the disclosure utilizing a transmissive fluorescent wheel.

In one embodiment, a transmissive fluorescent wheel is utilizes. With reference to FIG. 5A, in this embodiment, the first light source engine 100 of the optical device 3 comprises a first light source 120, a first lens unit (L1~L3) and a first reflector 140. The first light beam 110 (in this embodiment, the first light beam is blue light) travels from the first light source 120, passing through the first lens group (L1) of the first lens unit and the fluorescent wheel 10, the second lens group (L2) of the first lens unit, the first reflector 140 and the third lens group (L3) of the first lens unit to be output. A plurality of gaps are formed within the fluorescent powder in the fluorescent powder area 15 of the fluorescent wheel 10. Therefore, a portion of the first light beam directly passing through the fluorescent wheel 10 via the gaps, and the fluorescent powder in the fluorescent powder area 15 of the fluorescent wheel is induced by the other portion of the first light beam 110 to generate a first induced light (in this embodiment, the first induced light is red light and green light). The first induced light passes through the fluorescent wheel 10 (the first induced light and the portion of the first light beam directly passing through the fluorescent wheel are presented by a first combination light 114). The first combination light 114 is reflected by the first reflector 140 to be output. The second light source engine 200 comprises a second light source 220, a second lens unit (L21~L23) and a second reflector 240. The second light beam 210 (in this embodiment, the second light beam is blue light) travels from the second light source 220, passing through the fourth lens group (L21) of the second lens unit, the fluorescent wheel, the fifth lens group (L22) of the second lens unit, the second reflector 240 and the six lens group (L23) of the second lens unit to be output. A plurality of gaps are formed within the fluorescent powder in the fluorescent powder area 15 of the fluorescent wheel 10. Therefore, a portion of the second light beam 210 directly passing through the fluorescent wheel 10 via the gaps, and the fluorescent powder in the fluorescent powder area 15 of the fluorescent wheel is induced by the other portion of the second light beam 210 to generate a second induced light (in this embodiment, the second induced light is red light and green light). The second induced light passes through the fluorescent wheel 10 (the second induced light and the portion of the second light beam directly passing through the fluorescent wheel are presented by a second combination light 214). The second combination light 214 is reflected by the second reflector 240 to be output.

Figure 5B:
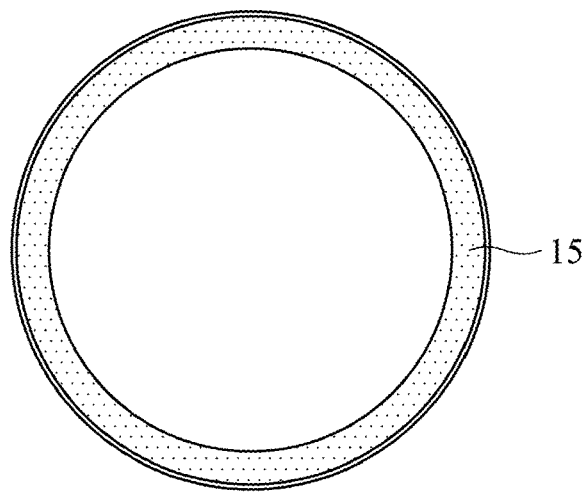
FIG. 5B shows a fluorescent wheel of the embodiment of FIG. 5A.
Figure 5C:
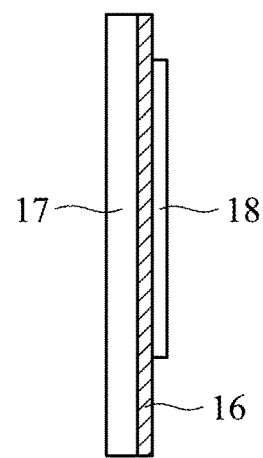
FIG. 5C is a side view of the fluorescent wheel of the embodiment of FIG. 5A.

FIGS. 5B and 5C show the fluorescent wheel 10 of the embodiment of FIG. 5A, wherein the fluorescent wheel 10 has no transparent portion. The fluorescent wheel 10 comprises a transmissive substrate 17, a spectral coating layer 16 and a fluorescent agents coating layer 18. The transmissive substrate 17 is made of glass. The spectral coating layer 16 allows a blue light to pass through and reflects a yellow light.

Figure 6A:
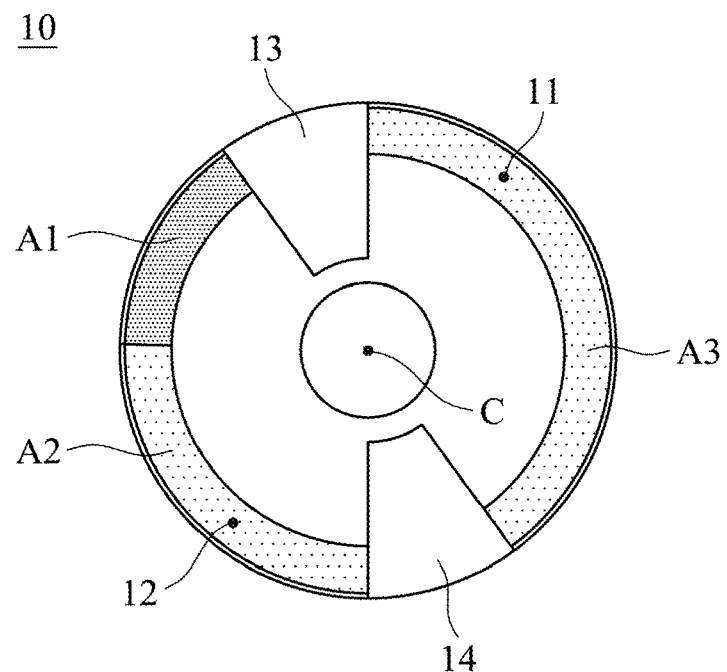
FIG. 6A shows a fluorescent wheel of an embodiment of the disclosure.
Figure 6B:
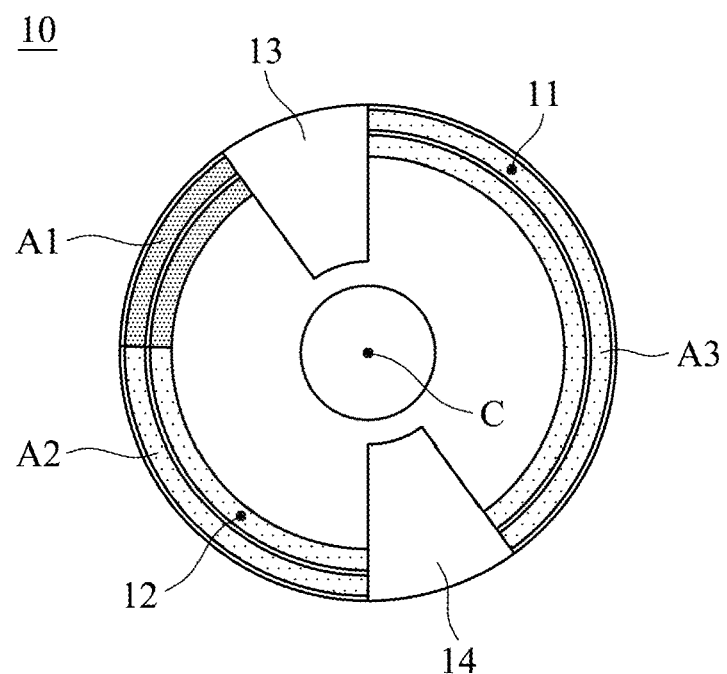
FIG. 6B shows another fluorescent wheel of an embodiment of the disclosure.

FIGS. 6A and 6B show another embodiment of the disclosure, wherein the fluorescent wheel 10 has a first transparent portion 13 and a second transparent portion 14. The fluorescent powder area of the fluorescent wheel 10 comprises a first section (green fluorescent powder) A1, a second section (yellow fluorescent powder) A2 and a third section (yellow fluorescent powder) A3. The color of the first section A1 differs from the color of the second section A2. The color of the third section A3 differs from the color of the first section A1. The first section A1, the second section A2 and the third section A3 are arranged along the circumference of the fluorescent wheel. In this embodiment, the color of the second section A2 is the same as the color of the third section A3, however, the disclosure is not meant to restrict the disclosure. A first distance is formed between the first light spot 11 and the center C of the fluorescent wheel 10. A second distance is formed between the second light spot 12 and the center C of the fluorescent wheel 10. The first distance can be the same as the second distance (FIG. 6A). In another embodiment, the first distance can be different from the second distance (FIG. 6B). The colors of the first section, the second section and the third section can be modified in other embodiments.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term).

While the disclosure has been described by way of example and in terms of the preferred embodiments, it is to be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical device, comprising:
   a fluorescent wheel, comprising a fluorescent powder area;
   a first light source engine, providing a first light beam, wherein the first light beam forms a first light spot on the fluorescent powder area of the fluorescent wheel; and
   a second light source engine, providing a second light beam, wherein the second light beam forms a second light spot on the fluorescent powder area of the fluorescent wheel, and the first light spot is separated from the second light spot,
   wherein a first straight line passes through a center of the fluorescent wheel and the first light spot, a second line passes through the center of the fluorescent wheel and the second light spot, and an included angle between the first straight line and the second straight line is between 45 degrees and 180 degrees, and
   wherein the fluorescent powder area of the fluorescent wheel comprises a first section, a second section and a third section, a color of the first section differs from a color of the second section, a color of the third section differs from the color of the first section, and the first section, the second section and the third section are arranged along a circumference of the fluorescent wheel; and wherein the first light spot and the second light spot produce different colors at least once per rotation and the first light spot and the second light spot produce different colors at least once per rotation.

2. The optical device as claimed in claim 1, wherein a first distance is formed between the first light spot and a center of the fluorescent wheel, a second distance is formed between the second light spot and the center of the fluorescent wheel, and the first distance differs from the second distance.

3. The optical device as claimed in claim 1, wherein the fluorescent wheel comprises a first transparent portion and a second transparent portion, and when the first transparent portion corresponds to the first light source engine, the second transparent portion corresponds to the second light source engine, and the first light beam passes through the first transparent portion, and the second light beam passes through the second transparent portion.

4. The optical device as claimed in claim 1, wherein the first light source engine is independent from the second light source engine.

5. The optical device as claimed in claim 3, wherein the first light source engine comprises a first light source, a first lens unit and a first dichroic mirror, wherein in a first mode, the first light beam travels from the first light source, passing through a first lens group of the first lens unit, the first dichroic mirror, a second lens group of the first lens unit, the first transparent portion or the second transparent portion of the fluorescent wheel, a third lens group of the first lens unit, and a fourth lens group of the first lens unit to be output, wherein in a second mode, the first light beam travels from the first light source, passing through the first lens group of the first lens unit, the first dichroic mirror, and the second lens group of the first lens unit to the fluorescent wheel, and fluorescent powder in the fluorescent powder area of the fluorescent wheel is induced by the first light beam and generates a first induced light, and the first induced light travels from the fluorescent wheel, passing through the second lens group of the first lens unit, reflected by the first dichroic mirror and passing through the fourth lens group of the first lens unit to be output.

6. The optical device as claimed in claim 5, wherein the second light source engine comprises a second light source, a second lens unit and a second dichroic mirror, wherein in the first mode, the second light beam travels from the second light source, passing through a fifth lens group of the second lens unit, the second dichroic mirror, a sixth lens group of the second lens unit, the first transparent portion or the second transparent portion of the fluorescent wheel, a seventh lens group of the second lens unit, and an eighth lens group of the second lens unit to be output, wherein in the second mode, the second light beam travels from the second light source, passing through the fifth lens group of the second lens unit, the second dichroic mirror, and the sixth lens group of the second lens unit to the fluorescent wheel, and the fluorescent powder in the fluorescent powder area of the fluorescent wheel is induced by the second light beam and generates a second induced light, and the second induced light travels from the fluorescent wheel, passing through sixth lens group of the second lens unit, reflected by the second dichroic mirror and passing through the eighth lens group of the second lens unit to be output.

7. The optical device as claimed in claim 1, wherein the first light source engine comprises a first sub light source, a second sub light source, a first lens unit and a first dichroic mirror, wherein the first light beam travels from the first sub light source, passing a portion of the first lens unit, and the first dichroic mirror to the fluorescent wheel, fluorescent powder in the fluorescent powder area of the fluorescent wheel is induced by the first light beam to generate a first induced light, and the first induced light travels from the fluorescent wheel, passing through a portion of the first lens unit, and reflected by the first dichroic mirror to be output, and a third light beam travels from the second sub light source, passing a portion of the first lens unit and the first dichroic mirror to be output.

8. The optical device as claimed in claim 7, wherein the second light source engine comprises a third sub light source, a fourth sub light source, a second lens unit and a second dichroic mirror, wherein the second light beam travels from the third sub light source, passing a portion of the second lens unit, and the second dichroic mirror to the fluorescent wheel, the fluorescent powder in the fluorescent powder area of the fluorescent wheel is induced by the second light beam to generate a second induced light, and the second induced light travels from the fluorescent wheel, passing through a portion of the second lens unit, and reflected by the second dichroic mirror to be output, and a fourth light beam travels from the fourth sub light source, passing a portion of the second lens unit and the second dichroic mirror to be output.

9. The optical device as claimed in claim 3, wherein the first light source engine comprises a first light source, a first lens unit and a first reflector, wherein the first light beam travels from the first light source, passing through a portion of the first lens unit and the fluorescent wheel, a portion of the first light beam directly passing through the fluorescent wheel, fluorescent powder in the fluorescent powder area of the fluorescent wheel is induced by the other portion of the first light beam to generate a first induced light, and the first induced light passes through the fluorescent wheel, and both the first induced light and the portion of the first light beam directly passing through the fluorescent wheel are reflected by the first reflector to be output.

10. The optical device as claimed in claim 9, wherein the second light source engine comprises a second light source, a second lens unit and a second reflector, wherein the second light beam travels from the second light source, passing through a portion of the second lens unit and the fluorescent wheel, a portion of the second light beam directly passing through the fluorescent wheel, the fluorescent powder in the fluorescent powder area of the fluorescent wheel is induced by the other portion of the second light beam to generate a second induced light, and the second induced light passes through the fluorescent wheel, and both the second induced light and the portion of the second light beam directly passing through the fluorescent wheel are reflected by the second reflector to be output.

* * * * *